US011051170B2

(12) United States Patent
Lin

(10) Patent No.: US 11,051,170 B2
(45) Date of Patent: Jun. 29, 2021

(54) UNLOCKING MOBILE TERMINAL IN AUGMENTED REALITY

(71) Applicant: BEIJING XIAOMI MOBILE SOFTWARE CO., LTD., Beijing (CN)

(72) Inventor: Xingsheng Lin, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 216 days.

(21) Appl. No.: 16/101,813

(22) Filed: Aug. 13, 2018

(65) Prior Publication Data

US 2019/0057205 A1 Feb. 21, 2019

(30) Foreign Application Priority Data

Aug. 16, 2017 (CN) .......................... 201710700646.4

(51) Int. Cl.
*G06F 21/35* (2013.01)
*H04W 12/08* (2021.01)
(Continued)

(52) U.S. Cl.
CPC ............ *H04W 12/08* (2013.01); *G06F 3/017* (2013.01); *G06F 3/0304* (2013.01); *G06F 3/038* (2013.01); *G06F 21/35* (2013.01); *G06F 21/84* (2013.01); *G06K 9/00208* (2013.01); *G06K 9/78* (2013.01); *G06T 19/006* (2013.01);
(Continued)

(58) Field of Classification Search
CPC ........ G06F 21/35; G06F 3/038; G06F 3/0304; G06F 3/017; G06F 21/84; G06F 21/34; H04W 12/08; H04W 88/02; H04W 4/80; H04W 12/00504; G06K 9/00208; G06K 9/78; G06T 19/006; G06T 2200/24; H04M 1/7253; H04M 1/72577; H04M 1/67; H04M 1/72569; H04M 2250/12; H04M 2250/02; H04L 63/0853
See application file for complete search history.

(56) References Cited

U.S. PATENT DOCUMENTS 8,430,310 B1 4/2013 Ho et al.
8,646,060 B1 * 2/2014 Ben Ayed ........... H04L 63/0853
726/9
(Continued)

FOREIGN PATENT DOCUMENTS

CN 103186793 A 7/2013
CN 103581443 A 2/2014
(Continued)

OTHER PUBLICATIONS

European Patent Office: European Search Report mailed in corresponding European Patent Application No. 18188996.5 dated Dec. 14, 2018. (9 pages).
(Continued)

*Primary Examiner* — Meng Li
(74) *Attorney, Agent, or Firm* — Arch & Lake LLP

(57) ABSTRACT

An unlocking method and an unlocking apparatus are provided. According to an example, the unlocking method comprises: determining whether a mobile terminal to be unlocked exists; and sending a preset instruction to the mobile terminal when the mobile terminal to be unlocked exists, where the preset instruction is configured to control the mobile terminal to unlock a display screen.

16 Claims, 11 Drawing Sheets

(51) Int. Cl.

| | | |
|---|---|---|
| *G06F 3/038* | (2013.01) | |
| *G06F 3/03* | (2006.01) | |
| *G06F 3/01* | (2006.01) | |
| H04M 1/72412 | (2021.01) | |
| H04M 1/72463 | (2021.01) | |
| *G06F 21/84* | (2013.01) | |
| *G06K 9/00* | (2006.01) | |
| *G06K 9/78* | (2006.01) | |
| *G06T 19/00* | (2011.01) | |
| *H04L 29/06* | (2006.01) | |
| *H04W 88/02* | (2009.01) | |
| *G06F 21/34* | (2013.01) | |
| *H04W 4/80* | (2018.01) | |
| *H04W 12/65* | (2021.01) | |

(52) U.S. Cl.
CPC ... *H04M 1/72412* (2021.01); *H04M 1/72463* (2021.01); *G06F 21/34* (2013.01); *G06T 2200/24* (2013.01); *H04L 63/0853* (2013.01); *H04W 4/80* (2018.02); *H04W 12/65* (2021.01); *H04W 88/02* (2013.01)

(56) References Cited

U.S. PATENT DOCUMENTS

| | | | | |
|---|---|---|---|---|
| 8,769,643 | B1* | 7/2014 | Ben Ayed | G06F 21/645 |
| | | | | 726/5 |
| 2008/0020733 | A1* | 1/2008 | Wassingbo | G06F 21/32 |
| | | | | 455/411 |
| 2012/0035932 | A1 | 2/2012 | Jitkoff et al. | |
| 2012/0129460 | A1* | 5/2012 | Hodis | G01S 19/48 |
| | | | | 455/67.11 |
| 2013/0204939 | A1* | 8/2013 | Yajima | H04W 4/21 |
| | | | | 709/204 |
| 2014/0099923 | A1* | 4/2014 | Kalderen | H04W 12/0802 |
| | | | | 455/411 |
| 2014/0325176 | A1* | 10/2014 | Messina | G06F 21/10 |
| | | | | 711/164 |
| 2015/0212681 | A1 | 7/2015 | Shinozaki | |
| 2016/0119789 | A1* | 4/2016 | Hu | H04W 4/80 |
| | | | | 455/411 |
| 2017/0010674 | A1* | 1/2017 | Ide | H04B 13/005 |
| 2017/0270763 | A1* | 9/2017 | Hastings | H04W 4/027 |
| 2018/0084106 | A1* | 3/2018 | Li | H04M 1/7253 |

FOREIGN PATENT DOCUMENTS

| | | | |
|---|---|---|---|
| CN | 103631503 | A | 3/2014 |
| CN | 104284004 | A | 1/2015 |
| CN | 104704450 | A | 6/2015 |
| CN | 105323376 | A | 2/2016 |
| CN | 106293075 | A | 1/2017 |
| CN | 106339073 | A | 1/2017 |
| CN | 106506812 | A * | 3/2017 |
| EP | 1359733 | A1 | 11/2003 |
| EP | 2811384 | A1 | 12/2014 |
| KR | 101596760 | B1 | 2/2016 |
| WO | 2015070623 | A1 | 5/2015 |

OTHER PUBLICATIONS

Christian Winkler et al:"Glass Unlock", Human Factors in Computing Systems, ACM,2 Penn Plaza, Suite 701 New York NY 10121-0701 USA, Apr. 18, 2015 (Apr. 18, 2015), pp. 1407-1410, XP058068208.

First Office Action and Search Report issued in Chinese Application No. 201710700646.4, Jul. 29, 2019 and English translation (23p).

Second Office Action issued in Chinese Application No. 201710700646.4, dated Mar. 23, 2020 with English translation (14p).

European Office Action Issued in EP Application No. 18188996.5 dated May 11, 2020, (6p).

Third Office Action issued in Chinese Application No. 201710700646.4, dated Oct. 9, 2020 with English translation, (15p).

* cited by examiner

UNLOCKING MOBILE TERMINAL IN AUGMENTED REALITY

CROSS REFERENCE TO RELATED APPLICATIONS

This application claims priority to Chinese Patent Application No. 201710700646.4 filed on Aug. 16, 2017, the entire content of which is incorporated herein by reference.

TECHNICAL FIELD

The present disclosure relates to the field of communication technology, and in particular to unlocking a mobile terminal.

BACKGROUND

With the development of Augmented Reality (AR) technology, a control device is used more widely. Further, when using the control device, a user will focus on a scene picture displayed by the control device.

SUMMARY

The present disclosure provides an unlocking method and apparatus as well as an electronic device.

According to a first aspect of the present disclosure, an unlocking method is provided. The method may include: determining, by a control device for Augmented Reality (AR), whether a mobile terminal to be unlocked exists; and sending, by the control device, a preset instruction to the mobile terminal to be unlocked when the mobile terminal to be unlocked exists, wherein the preset instruction is used to control the mobile terminal to unlock a display screen.

According to a second aspect of the present disclosure, an unlocking method is provided. The method may include: receiving, by a mobile terminal applied to Augmented Reality (AR), a preset instruction from a control device of the AR, wherein the preset instruction is used to control the mobile terminal to unlock a display screen; and unlocking, by the mobile terminal, the display screen in response to the preset instruction.

According to a third aspect of the present disclosure, an unlocking apparatus is provided. The apparatus may include: a processor and a memory storing instructions executable by the processor; wherein by executing the processor executable instructions, the processor is caused to: determine whether a mobile terminal to be unlocked exists; and send a preset instruction to the mobile terminal to be unlocked when the mobile terminal to be unlocked exists, wherein the preset instruction is used to control the mobile terminal to unlock a display screen.

According to a fourth aspect of the present disclosure, an unlocking apparatus is provided. The apparatus may include a display screen, a processor and a memory for storing instructions executable by the processor; wherein the processor is configured to: receive a preset instruction from a control device of Augmented Reality (AR), wherein the preset instruction is used to control the unlocking apparatus to unlock a display screen; and unlock the display screen in response to the preset instruction.

According to a fifth aspect of the present disclosure, a computer readable storage medium storing a computer program is provided, wherein the computer readable storage medium stores a plurality of computer instructions, and the computer instructions are executed to: determine whether a mobile terminal to be unlocked exists; and send a preset instruction to the mobile terminal to be locked when the mobile terminal to be unlocked exists, wherein the preset instruction is used to control the mobile terminal to unlock a display screen.

According to a sixth aspect of the present disclosure, a computer readable storage medium storing a computer program is provided, wherein the computer readable storage medium stores a plurality of computer instructions, and the computer instructions are executed to: receive a preset instruction from a control device, wherein the preset instruction is used to control a mobile terminal to unlock a display screen; and unlock the display screen in response to the preset instruction.

It should be understood that the above general description and the following detailed description are merely exemplary and explanatory, and do not limit the present disclosure.

The details of one or more embodiments of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

BRIEF DESCRIPTION OF DRAWINGS

Accompanying drawings herein are incorporated in the specification to form a part of the specification, illustrate examples consistent with the present disclosure, and serve to explain the principle of the present disclosure together with the specification.

DETAILED DESCRIPTION

Figure 1:
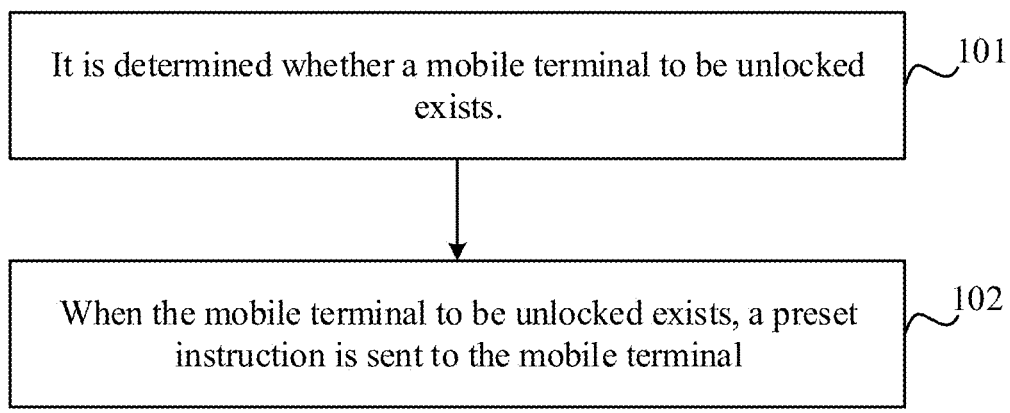
FIG. 1 is a flowchart illustrating an unlocking method according to an example of the present disclosure.

Examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are examples of an apparatus and a method consistent with some aspects of the present disclosure described in detail in the appended claims.

When a terminal device, for example, a mobile phone, connected with a control device for AR receives a text message or chat message, if the control device only makes a prompt in a scene picture, a user needs to take out the mobile phone and wake up or unlock the mobile phone to view the message. Since the user focuses on operating the mobile phone, the user may miss part of the scene pictures. For this purpose, the present disclosure provides an unlocking method of a terminal device.

FIG. 1 is a flowchart illustrating an unlocking method according to an example of the present disclosure. The method may be applied to a control device. As shown in FIG. 1, the unlocking method may include the following blocks.

Block 101: it is determined whether a mobile terminal to be unlocked exists. For example, the control device may determine whether the mobile terminal exists in an image obtained by the control device.

Block 102: when the mobile terminal to be unlocked exists, a preset instruction is sent to the mobile terminal, where the preset instruction is used to control the mobile terminal to unlock a display screen of the mobile terminal. For example, the control device may send the preset instruction to the mobile terminal so that the mobile terminal may perform an action according to the preset instruction. Here, the preset instruction may include one of the following actions: unlocking the mobile terminal, locking the mobile terminal, adjusting the audio input of the mobile terminal, running an application in the mobile terminal, taking a picture, and etc.

In an example of the present disclosure, after it is determined that the mobile terminal to be unlocked exists, the preset instruction is sent to the mobile terminal. The above preset instruction is used to control the mobile terminal to unlock the display screen so that the display screen may be unlocked quickly without manually performing unlocking by the user, which effectively improves use experience of the user.

An image may be collected or displayed by an apparatus having an image collecting and/or displaying function, such as a camera and AR glasses. The device having the above function in the example of the present disclosure is referred to as a control device.

Figure 2:
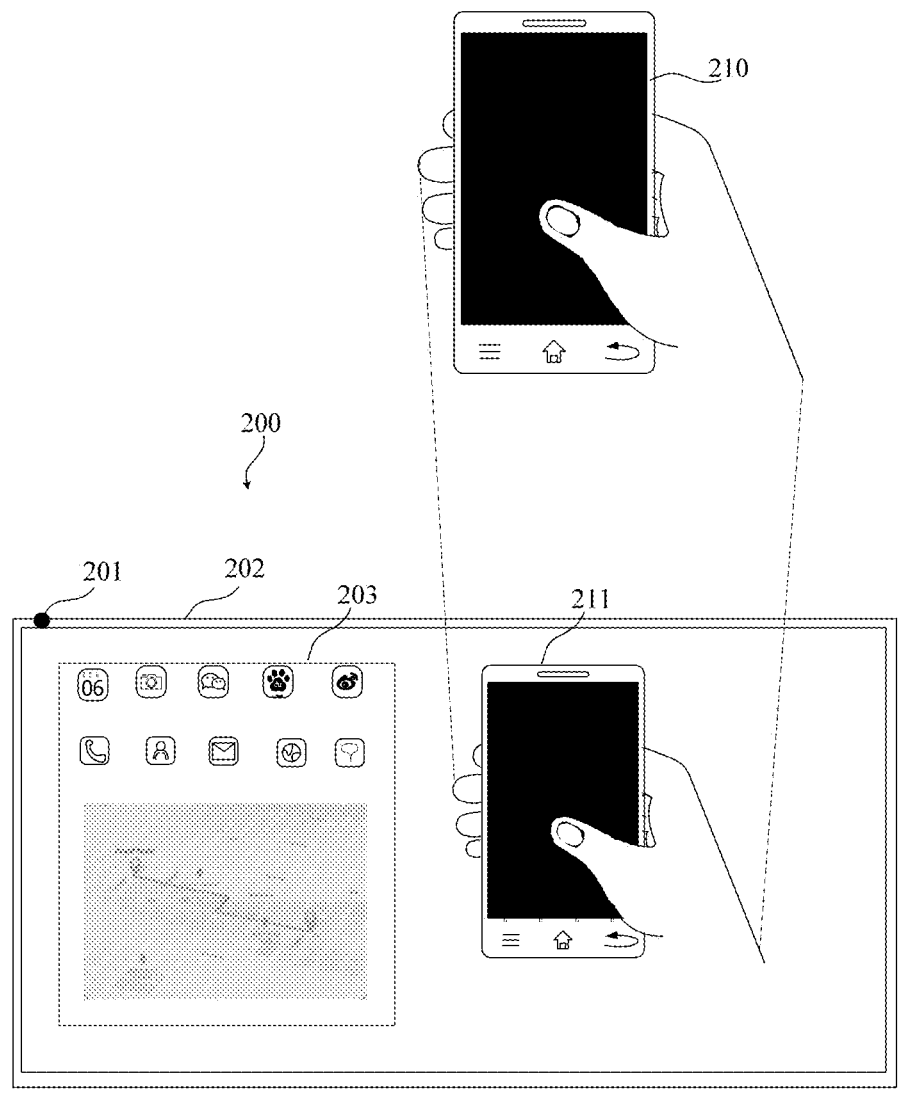
FIG. 2 is a schematic diagram illustrating an application scenario of an unlocking method according to an example of the present disclosure.

For example, as shown in FIG. 2, a scene picture 202 of AR glasses 200 may include a real image 211 collected by a camera 201 and virtual content 203 such as an added image and an added video. At this time, the AR glasses 200 may determine whether a mobile terminal 210 exists in the image collected by the camera 201 according to the image 202 in the scene picture 202.

For another example, as shown in FIG. 2, the camera 201 may photograph an image, and then determine whether the mobile terminal 210 exists according to the above image.

Figure 3:
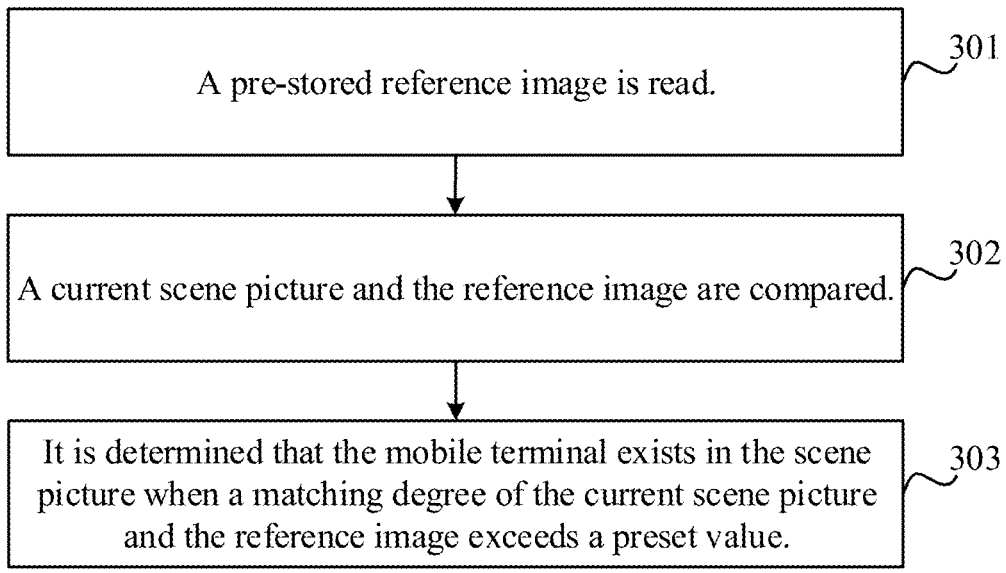
FIG. 3 is a flowchart illustrating an unlocking method according to another example of the present disclosure.

In an example of the present disclosure, a process of determining whether a mobile terminal to be unlocked exists at block 101 may include the following blocks, as shown in FIG. 3.

Block 301: a pre-stored reference image including a mobile terminal is obtained; the reference image may be an image including the mobile terminal, or an image including a mobile terminal identifier, or an image with a standard size of a mobile terminal, or the like, which is not limited in the present disclosure. A control device may communicate with the mobile terminal shown in the reference image.

Block 302: a current scene picture and the reference image are compared. The control device may compare the scene picture and the reference image locally or remotely.

Block 303: it is determined that the mobile terminal exists in the scene picture when a matching degree of the scene picture and the reference image exceeds a preset value.

It may be understood that determining whether a mobile terminal exists in an image in an example may be implemented by an image processing method in the related art, which is not limited in the present disclosure.

It is to be noted that the above mobile terminal may be a smartphone, a tablet computer, a smart watch, or other terminals having a display screen, etc. The mobile terminal may also be a smart appliance such as a smart TV, a smart fridge, or other smart devices having a display screen.

Figure 4:
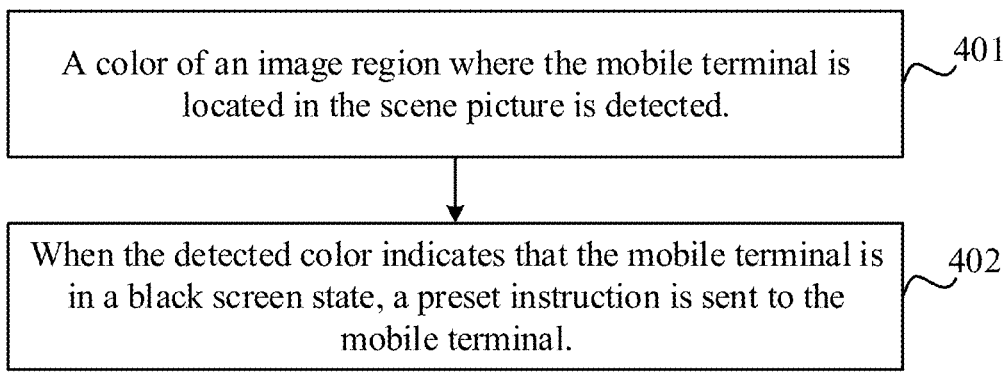
FIG. 4 is a flowchart illustrating an unlocking method according to still another example of the present disclosure.

In an actual application, a mobile terminal is usually in a black screen state when the mobile terminal is not used. In this way, the power consumption of the mobile terminal may be reduced. Therefore, in an example of the present disclosure, after it is determined that the mobile terminal exists at block 101, the unlocking method may also include the following blocks as shown in FIG. 4.

Block 401: a color of an image region where the mobile terminal is located in the scene picture is detected.

Block 402: when the detected color indicates that the mobile terminal is in a black screen state, a preset instruction is sent to the mobile terminal.

It may be understood that, in the example of the present disclosure, after it is determined that the image includes the mobile terminal, the color of the image region where the mobile terminal is located may be detected. If the color of the image region where the mobile terminal is located is black, that is, the mobile phone is in a black screen state (refer to FIG. 2), it indicates that the mobile terminal is not used and is in a screen-locked state. At this time, a preset instruction may be sent to the mobile terminal to unlock the display screen of the mobile terminal. The state of the mobile terminal may be directly determined by determining the color of the display screen, so that whether it is to unlock the display screen of the mobile terminal may be determined.

Figure 5:
FIG. 5 is a schematic diagram illustrating an application scenario of an unlocking method according to another example of the present disclosure.
Figure 6:
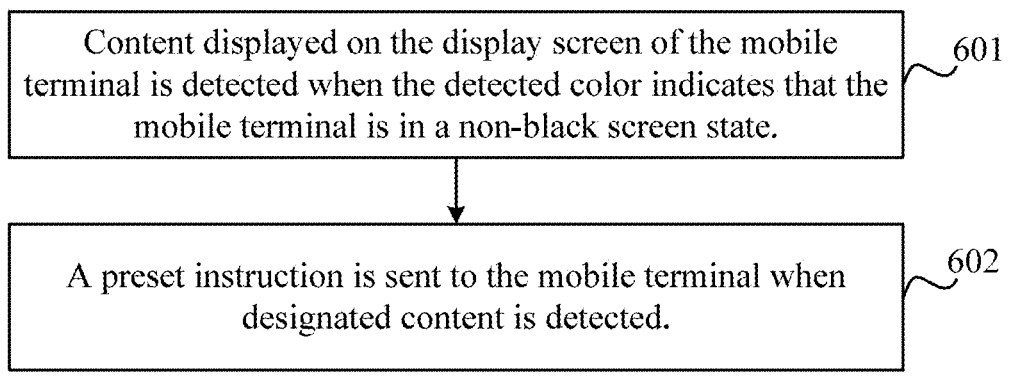
FIG. 6 is a flowchart illustrating an unlocking method according to still another example of the present disclosure.

The mobile terminal may be in a non-black screen state, as shown in FIG. 5. However, the mobile terminal may still be in a screen-locked state. At this time, the mobile terminal may be used only when the display screen is unlocked. Therefore, as shown in FIG. 6, the above unlocking method may also include the following blocks after block 401.

Block 601: content displayed on the display screen of the mobile terminal is detected when the detected color indicates that the mobile terminal is in a non-black screen state.

Block 602: a preset instruction is sent to the mobile terminal when designated content is detected.

It may be understood that the content displayed on the display screen of the mobile terminal may be detected in this example. If designated content such as "Please unlock", "Unlock?", "Slide left or right to unlock" or "Please enter a password" is displayed on the display screen of the mobile terminal, it may be determined that the display screen is in a locked state. At this time, a preset instruction may be sent to the mobile terminal to unlock the display screen of the mobile terminal. In this way, an applicable scenario of the unlocking method of the present disclosure may be improved.

It may be understood that the control device and the mobile terminal may establish a communication connection. For example, the control device and the mobile terminal may be connected to a same router, or in a same WiFi environment, or may be in infrared connection, which is not limited in the present disclosure.

Figure 7:
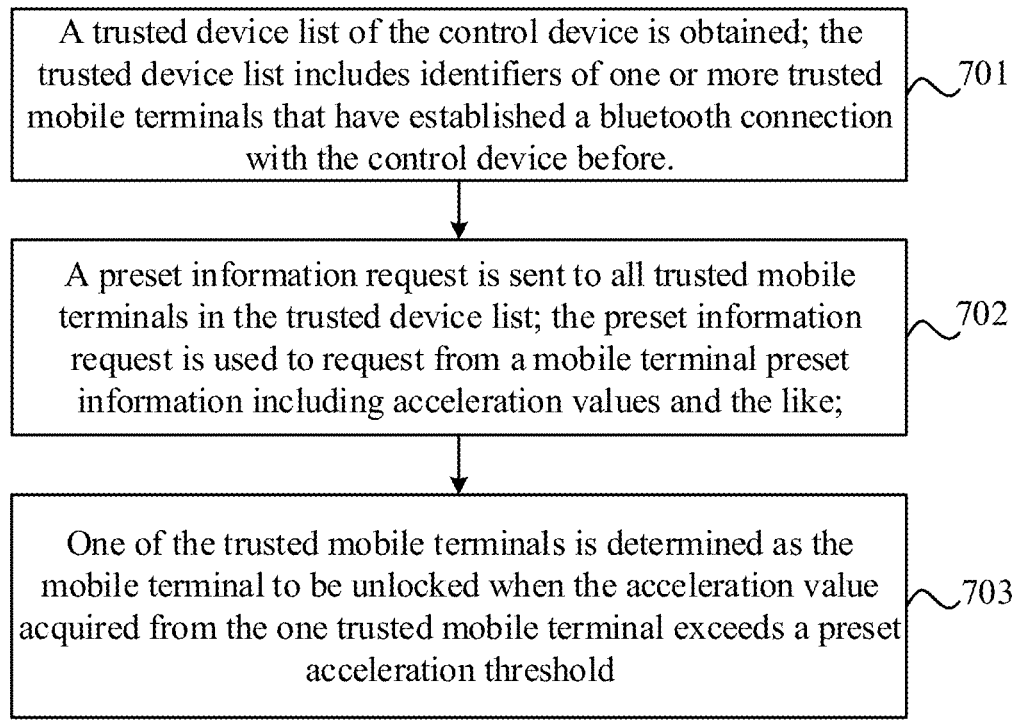
FIG. 7 is a flowchart illustrating an unlocking method according to still another example of the present disclosure.

Another example of the present disclosure also provides an unlocking method. As shown in FIG. 7, the unlocking method may include the following blocks.

Block 701: a trusted device list of the control device is obtained; the trusted device list includes identifiers of one or more trusted mobile terminals that have established a wireless connection with the control device before. For example, when the wireless connection includes a Bluetooth connection, the trusted device list includes identifiers of one or more trusted mobile terminals that have established a Bluetooth connection with the control device before.

Block 702: a preset information request is sent to all trusted mobile terminals in the trusted device list; the preset information request is used to request from a trusted mobile terminal preset information including an acceleration value of the trusted mobile terminal and the like;

Block 703: one of the trusted mobile terminals is determined as the mobile terminal to be unlocked when the acceleration value acquired from the one trusted mobile terminal exceeds a preset acceleration threshold. It may be understood that the above acceleration threshold may be set according to different scenarios, which is not limited in the present disclosure.

In this example, the control device may obtain a trusted device list associated with the control device. The trusted device list may include identifiers of one or more trusted mobile terminals that have established a Bluetooth connection with the control device before. It may be understood that the identifier in the trusted device list may be a Media Access Control (MAC) address, or an identifier allocated to a trusted device, etc., for identifying an identity of the trusted device. The manner for allocating the identifier and the form of the identifier are not limited in the present disclosure. In addition, the trusted device list may be preset, and also may be established and updated by the control device.

The control device may send a preset information request to all trusted mobile terminals in the trusted device list to obtain preset information including an acceleration value of a corresponding mobile terminal and the like. In another example, the control device may send a preset information request to one or more trusted mobile terminals that have established a Bluetooth connection with the control device in the trusted device list.

When receiving the preset information request, each of the mobile terminals sends respective preset information to the control device. The preset information may include an values collected by sensors in the mobile terminal. For example, the preset information may include an acceleration value. In this case, the acceleration value may be used to indicate whether a mobile terminal moves, i.e. a user has a need for using the mobile terminal. For example, the user takes a mobile terminal out of a pocket and puts the mobile terminal before the face of the user; for another example, the user picks up a mobile terminal from a table and puts the mobile terminal before the face of the user; for still another example, the user picks up a mobile terminal from a table, adjusts a holding gesture, and then puts the mobile terminal before the face of the user.

Then, the control device may determine that a mobile terminal to be unlocked exists when preset information including an acceleration value larger than the set acceleration threshold exists.

In this example, by sending a preset information request to a mobile terminal based on the trusted device list, an acceleration value of the mobile terminal may be obtained, so that whether the mobile terminal moves may be determined based on the obtained acceleration value. In this way, calculation quantity of the control device may be reduced, thereby effectively improving accuracy of determining the mobile terminal to be unlocked.

Figure 8:
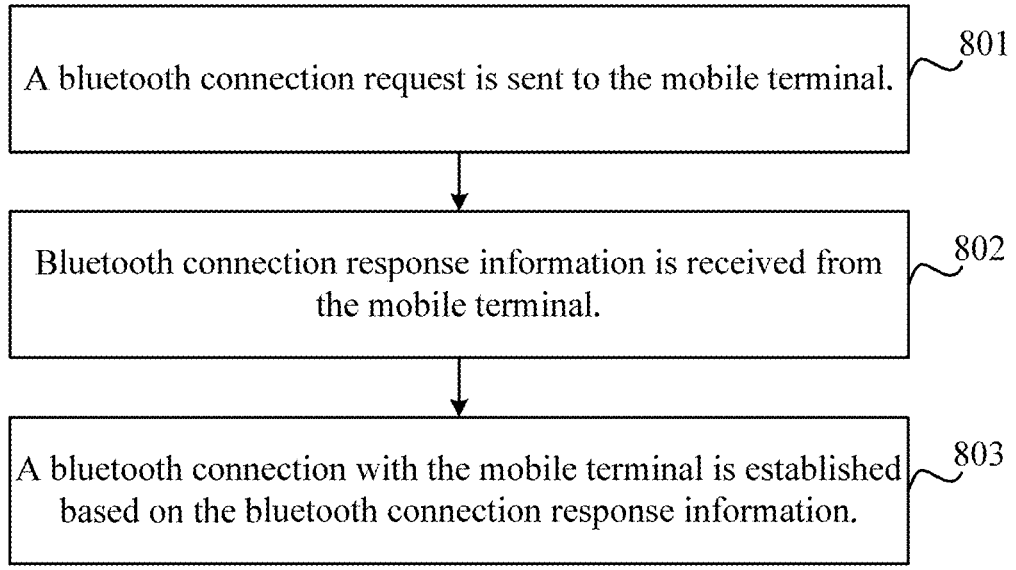
FIG. 8 is a flowchart illustrating an unlocking method according to still another example of the present disclosure.

It may be understood that, before sending a preset instruction to a mobile terminal, a control device may establish a communication connection with the mobile terminal, for example, the control device and the mobile terminal may be connected to a same router, or in a same WiFi environment, or in infrared communication. In an example of the present disclosure, the control device and the mobile terminal may be connected via Bluetooth. Therefore, before a preset instruction is sent to a mobile terminal, the unlocking method may also include the following blocks as shown in FIG. 8.

Block 801: a Bluetooth connection request is sent to the mobile terminal.

Block 802: Bluetooth connection response information is received from the mobile terminal.

Block 803: a Bluetooth connection with the mobile terminal is established based on the Bluetooth connection response information.

In this example, the control device may send a Bluetooth connection request to the mobile terminal, and establish a Bluetooth connection with the mobile terminal based on Bluetooth connection response information when receiving the Bluetooth connection response information from the mobile terminal. It may be understood that the control device and the mobile terminal may be always in low power Bluetooth connection, thereby saving power consumption and data traffic appropriately.

Figure 9:
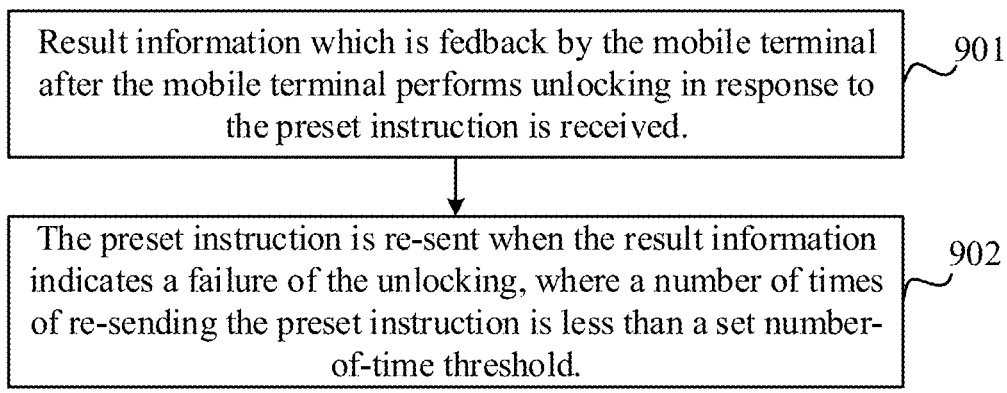
FIG. 9 is a flowchart illustrating an unlocking method according to still another example of the present disclosure.

In an example of the present disclosure, after the control device sends a preset instruction to a mobile terminal, the unlocking method may also include the following blocks as shown in FIG. 9.

Block 901: result information which is fed back by the mobile terminal after the mobile terminal performs unlocking in response to the preset instruction is received.

Block 902: the preset instruction is re-sent when it is determined that the result information indicates a failure of unlocking, where a number of times of re-sending the preset instruction is less than a set number-of-time threshold.

Here, the control device may receive the result information fed back by the mobile terminal after the mobile terminal performs unlocking in response to the preset instruction. When the result information indicates a failure of the unlocking, the control device may re-send the preset instruction to the mobile terminal. In this example, to reduce consumption of power and data traffic, the control device may stop sending the preset instruction when the number of times of re-sending the preset instruction reaches the preset number-of-times threshold. A success rate of unlocking may be increased by re-sending the preset instruction.

It is to be noted that different blocks of a method of the present disclosure may be cross-used to achieve the purpose of unlocking the mobile terminal.

Figure 10:
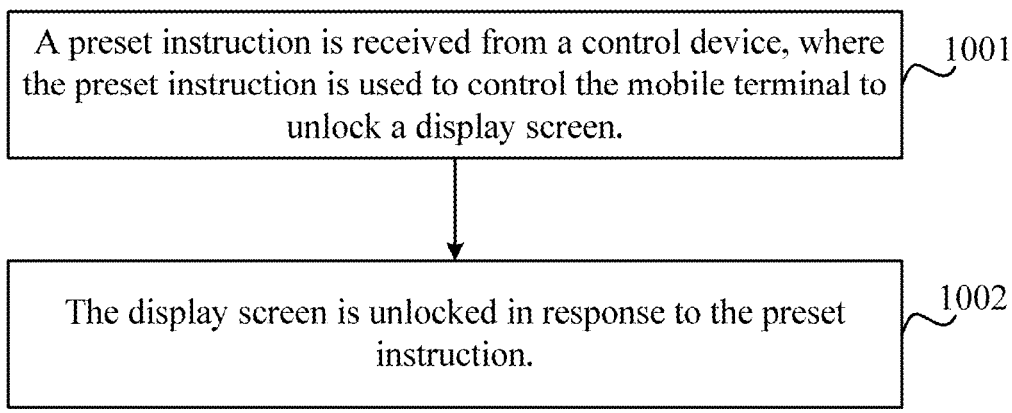
FIG. 10 is a flowchart illustrating an unlocking method according to an example of the present disclosure.

An example of the present disclosure also provides an unlocking method applied to a mobile terminal. As shown in FIG. 10, the unlocking method may include the following blocks.

Block 1001: a preset instruction is received from a control device, where the preset instruction is used to control the mobile terminal to unlock a display screen. The mobile terminal may be any terminal device in an Augmented Reality scene at least partially captured or provided by the control device.

Block 1002: the display screen is unlocked in response to the preset instruction. The mobile terminal may unlock its screen or perform other preset actions according to the preset instruction.

In this example, when receiving the preset instruction of the control device, the mobile terminal may unlock the display screen in response to the preset instruction. It may be seen in this example that a user does not have to perform manual unlocking, thereby effectively saving time and improving user experience.

Figure 11:
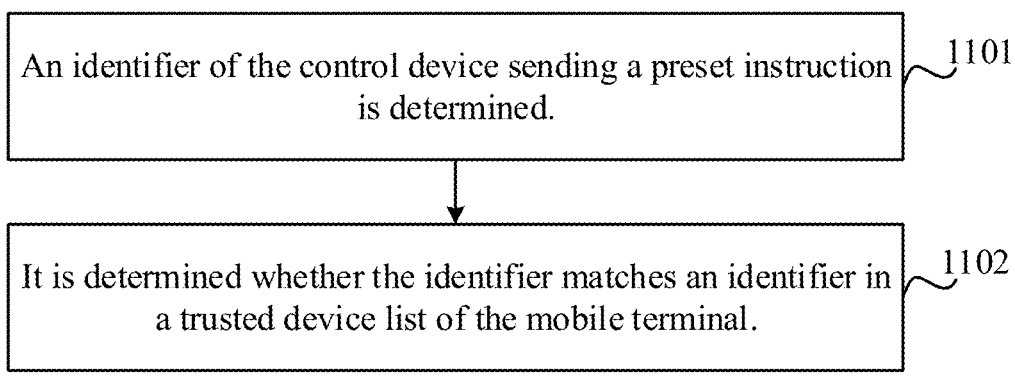
FIG. 11 is a flowchart illustrating an unlocking method according to another example of the present disclosure.

In an example of the present disclosure, to ensure security, before block 1002, the unlocking method may also include the following blocks as shown in FIG. 11.

Block 1101: an identifier of the control device sending the preset instruction is determined.

Block 1102: it is determined whether the identifier matches an identifier in a trusted device list of the mobile terminal.

The trusted device list of the mobile terminal includes identifiers of one or more control devices that have established a paired connection with the mobile terminal before. For example, the paired connection may be a Bluetooth connection or other wireless connections that pair the control device and the mobile terminal together.

In this example, the mobile terminal may determine the identifier of the control device that sends the preset instruction according to the preset instruction, and then compare the identifier with identifiers in the trusted device list, and unlock a display screen in response to the preset instruction when matching exists. In this way, the security of the mobile terminal may be improved.

Figure 12:
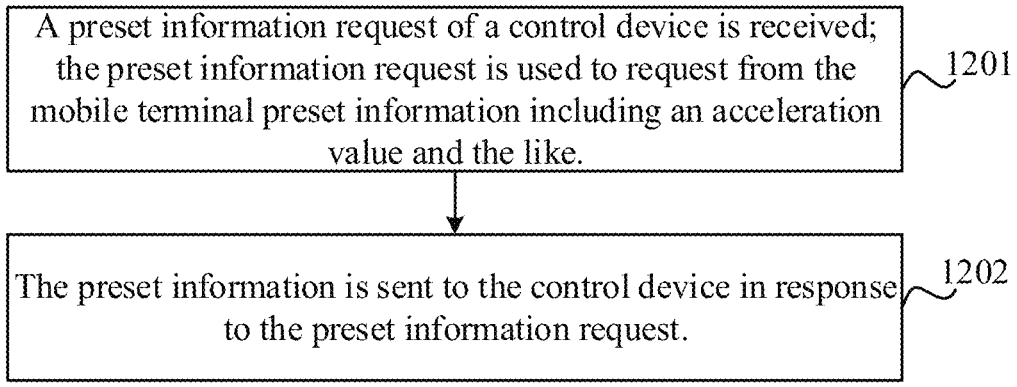
FIG. 12 is a flowchart illustrating an unlocking method according to still another example of the present disclosure.

In an example of the present disclosure, before block 1001, the unlocking method may also include the following blocks as shown in FIG. 12.

Block 1201: a preset information request from a control device is received; the preset information request is used to request from the mobile terminal preset information including an acceleration value of the mobile terminal and the like.

Block 1202: the preset information is sent to the control device in response to the preset information request.

In this example, when receiving the preset information request from the control device, the mobile terminal may obtain an acceleration value detected by an acceleration sensor within a previously preset time period, and then send the obtained acceleration value and the like to the control device as preset information. It may be understood that the above preset information may be selected according to an actual scenario, which is not limited in the present disclosure.

Figure 13:
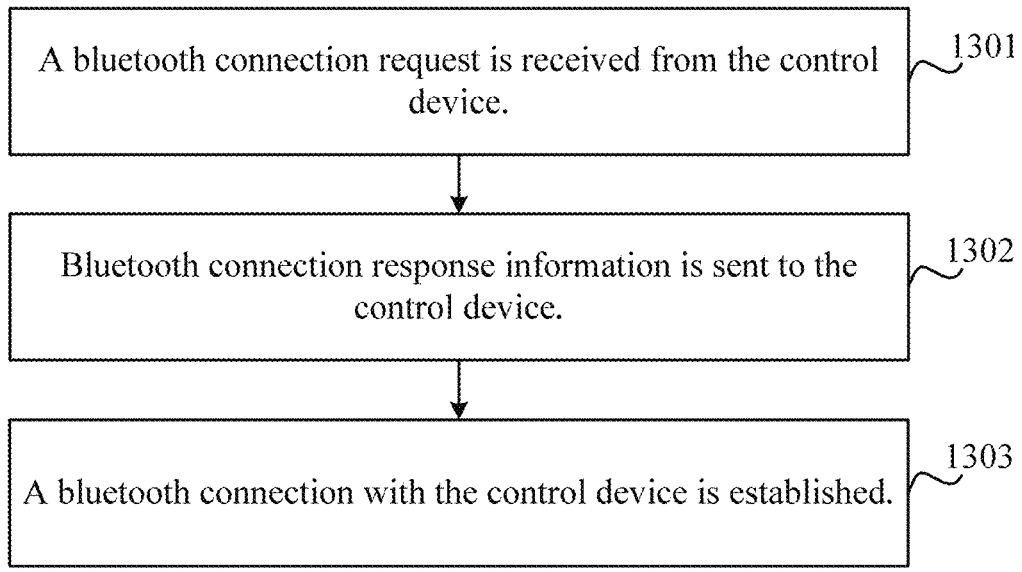
FIG. 13 is a flowchart illustrating an unlocking method according to yet another example of the present disclosure.

In an example of the present disclosure, before block 1001, the unlocking method may also include the following blocks as shown in FIG. 13.

Block 1301: a Bluetooth connection request is received from the control device.

Block 1302: Bluetooth connection response information is sent to the control device.

Block 1303: a Bluetooth connection with the control device is established.

In this example, the mobile terminal may receive the Bluetooth connection request from the control device. If the control device is in the trusted device list of the mobile terminal, the Bluetooth connection response information is sent to the control device, and the Bluetooth connection is established with the control device.

Figure 14:
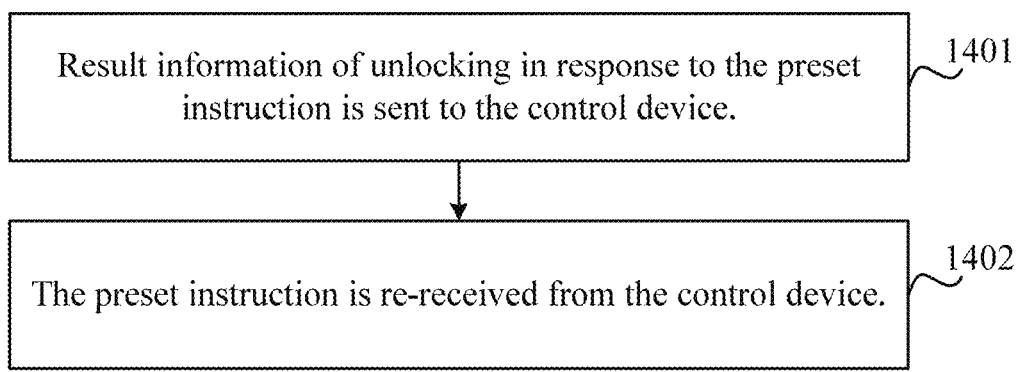
FIG. 14 is a flowchart illustrating an unlocking method according to yet another example of the present disclosure.

In an example of the present disclosure, after block 1002, the unlocking method may also include the following blocks as shown in FIG. 14.

Block 1401: result information of unlocking in response to the preset instruction is sent to the control device.

Block 1402: the preset instruction is re-received from the control device if the result information indicates a failure of unlocking.

In this example, the mobile terminal may send result information of an unlocking operation to the control device after performing the unlocking operation in response to the preset instruction of the control device. When the result information indicates a failure of unlocking, the preset instruction may be re-received from the control device. Then, another unlocking operation may be performed in response to the preset instruction. In this way, a success rate of unlocking may be increased.

An unlocking method provided by the present disclosure will be further described below in conjunction with an example in which AR glasses are taken as a control device, and a smartphone is taken as a mobile terminal.

If a user is to check a smartphone for received/missed messages, updates, etc., when wearing AR glasses, he/she may hold the smartphone in hand and put the smartphone before his/her face. At this time, a mobile terminal will appear in a scene picture of the AR glasses, and the AR glasses may extract characteristics from a collected image in the scene picture and compare the characteristics with those of a preset reference image of a smartphone. When determining that two pictures match successfully, the AR glasses may determine that the smartphone to be unlocked exists in the image. In this case, the AR glasses may send a Bluetooth connection request to the smartphone and establish a Bluetooth connection with the smartphone when receiving Bluetooth connection response information from the smartphone. Afterwards, the AR glasses may send a preset instruction to the smartphone. The smartphone may unlock a display screen in response to the preset instruction.

Alternatively or additionally, the AR glasses may send a preset information request to the smartphone, and the smartphone may then feedback preset information to the AR glasses in response to the above preset information request. When an acceleration value in the received preset information exceeds a set acceleration threshold, the AR glasses may determine that the smartphone is a mobile terminal taken out by a user. Then, the AR glasses may send a preset instruction to the smartphone. The smartphone may unlock a display screen in response to the preset instruction. It may be seen in this example that the display screen may be quickly unlocked, thereby improving the use experience of the user.

When receiving result information of unsuccessfully unlocking from the smartphone, the AR glasses may re-send the preset instruction to the smartphone to improve the success rate of unlocking the smartphone. When the number of times of re-sending the preset instruction reaches a preset number-of-time threshold, the AR glasses may stop sending the preset instruction, thereby effectively reducing the consumption of power and data traffic.

Figure 15:
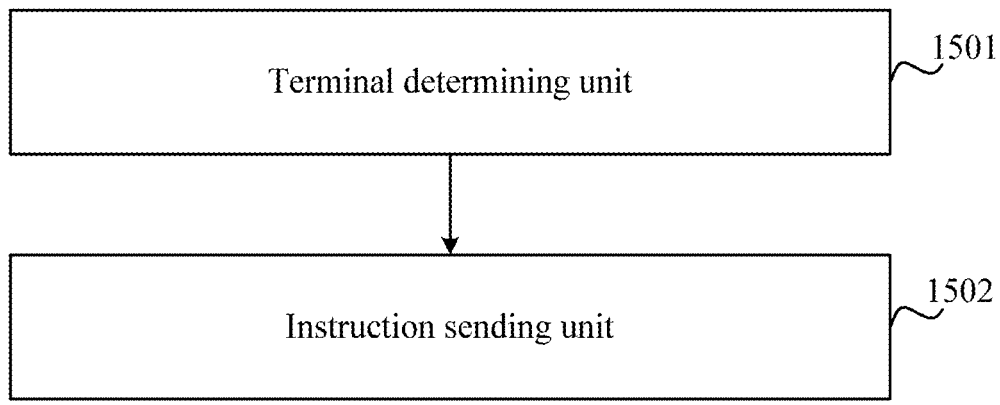
FIG. 15 is a block diagram illustrating an unlocking apparatus according to an example of the present disclosure.

An example of the present disclosure also provides an unlocking apparatus. As shown in FIG. 15, the apparatus may include:
  a terminal determining unit 1501, configured to determine whether a mobile terminal to be unlocked exists; and
  an instruction sending unit 1502, configured to send a preset instruction to the mobile terminal to be unlocked when the mobile terminal to be unlocked exists, where the preset instruction is used to control the mobile terminal to unlock a display screen.

Figure 16:
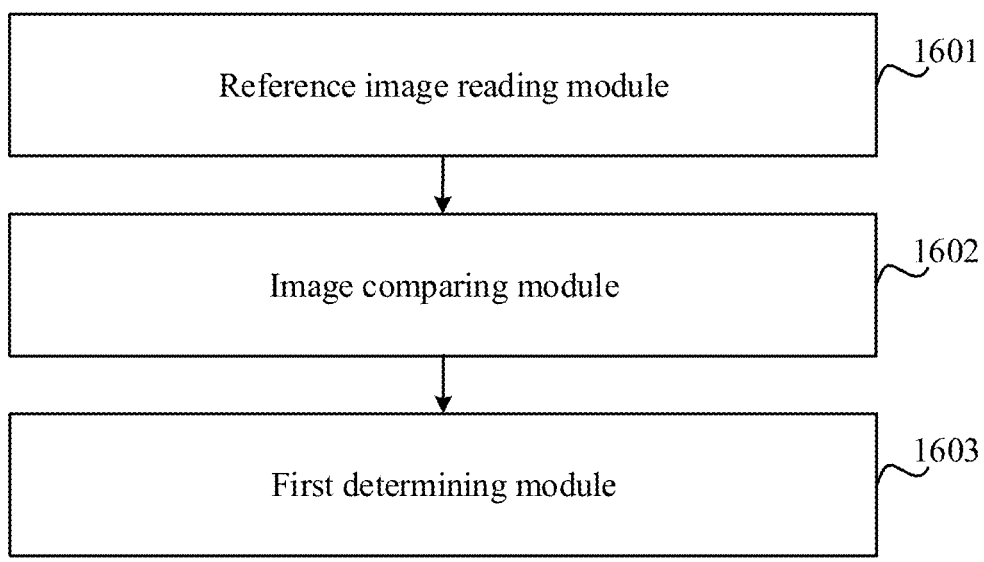
FIG. 16 is a block diagram illustrating an unlocking apparatus according to another example of the present disclosure.

In an example of the present disclosure, as shown in FIG. 16, the terminal determining unit 1501 may include:
  a reference image reading module 1601, configured to read a pre-stored reference image including a mobile terminal, where the reference image may be an image including a mobile terminal, or an image including a mobile terminal identifier, or an image with a standard size of a mobile terminal, or the like, which is not limited in the present disclosure;
  an image comparing module 1602, configured to compare a current scene picture and the reference image; and
  a first determining module 1603, configured to determine that a mobile terminal to be unlocked exists when a matching degree of the current scene picture and the reference image exceeds a preset value.

Figure 17:
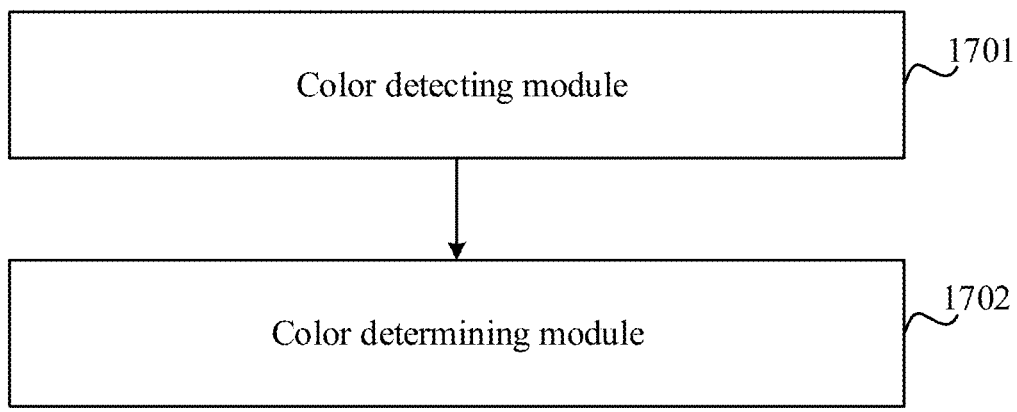
FIG. 17 is a block diagram illustrating an unlocking apparatus according to still another example of the present disclosure.

In another example of the present disclosure, the apparatus may also include a color detecting unit. As shown in FIG. 17, the color detecting unit may include:
  a color detecting module 1701, configured to detect a color of an image region where the mobile terminal is located in the scene picture; and
  a color determining module 1702, configured to trigger the instruction sending unit 1502 to send a preset instruction to the mobile terminal when the color detected by the color detecting module 1701 indicates that the mobile terminal is in a black screen state.

Figure 18:
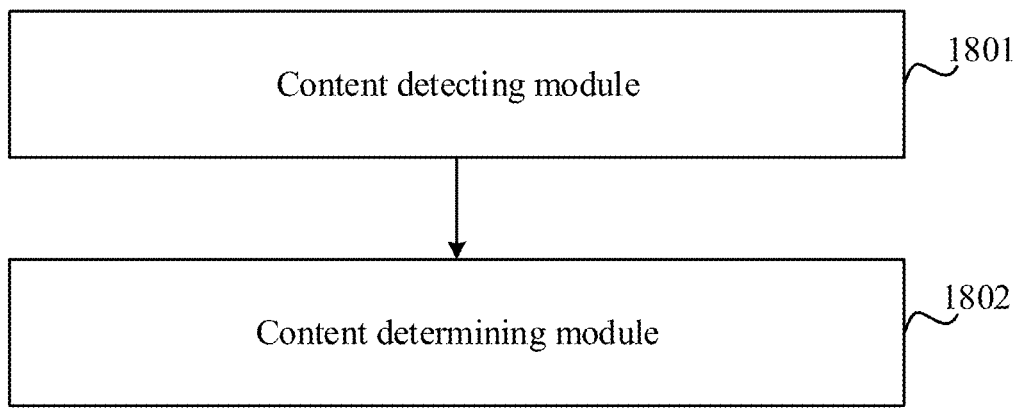
FIG. 18 is a block diagram illustrating an unlocking apparatus according to yet another example of the present disclosure.

In an example of the present disclosure, as shown in FIG. 18, the color detecting unit may also include:
  a content detecting module 1801, configured to detect content displayed on a display screen of the mobile terminal when the color determining module 1702 determines that the detected color indicates that the mobile terminal is in a non-black screen state; and
  a content determining module 1802, configured to trigger the instruction sending unit 1502 to send a preset instruction to the mobile terminal when the content displayed on the display screen of the mobile terminal detected by the content detecting module 1801 includes designated content.

Figure 19:
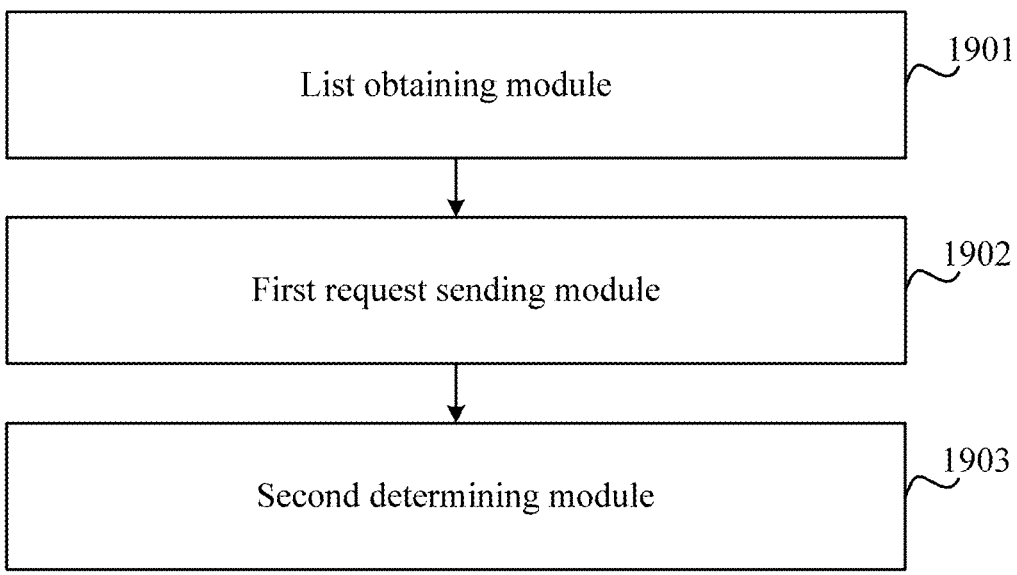
FIG. 19 is a block diagram illustrating an unlocking apparatus according to yet another example of the present disclosure.

In an example of the present disclosure, as shown in FIG. 19, the terminal determining unit 1501 may include:
  a list obtaining module 1901, configured to obtain a trusted device list of the control device, where the trusted device list includes identifiers of one or more mobile terminal that have established a Bluetooth connection with the control device before;
  a first request sending module 1902, configured to send a preset information request to all mobile terminals in the trusted device list, where the preset information request is used to request from a mobile terminal corresponding preset information including an acceleration value of the mobile terminal and the like; and
  a second determining module 1903, configured to determine one of the trusted mobile terminals as the mobile terminal to be unlocked when the acceleration value acquired from the one trusted mobile terminal exceeds a preset acceleration threshold.

Figure 20:
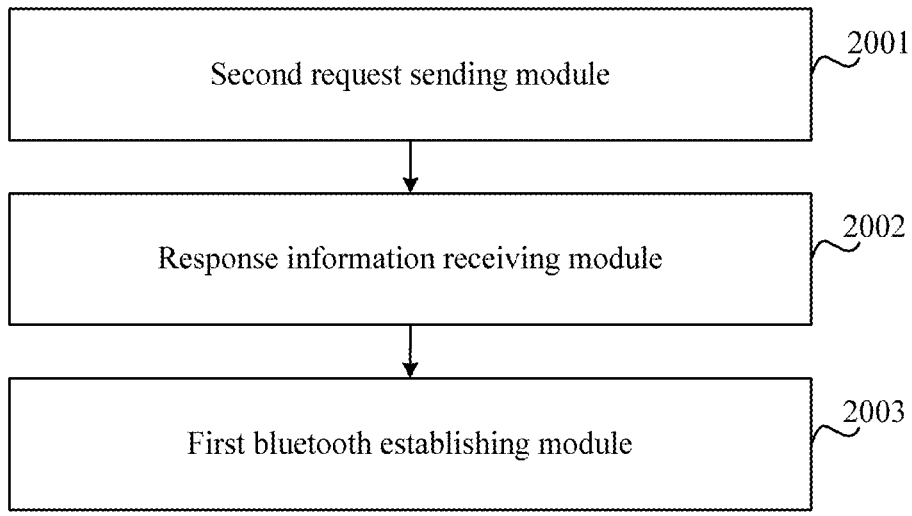
FIG. 20 is a block diagram illustrating an unlocking apparatus according to yet another example of the present disclosure.

In an example of the present disclosure, as shown in FIG. 20, the apparatus may also include a first Bluetooth unit. The first Bluetooth unit includes:
  a second request sending module 2001, configured to send a Bluetooth connection request to a mobile terminal;
  a response information receiving module 2002, configured to receive Bluetooth connection response information from the mobile terminal; and
  a first Bluetooth establishing module 2003, configured to establish a Bluetooth connection with the mobile terminal based on the Bluetooth connection response information.

Figure 21:
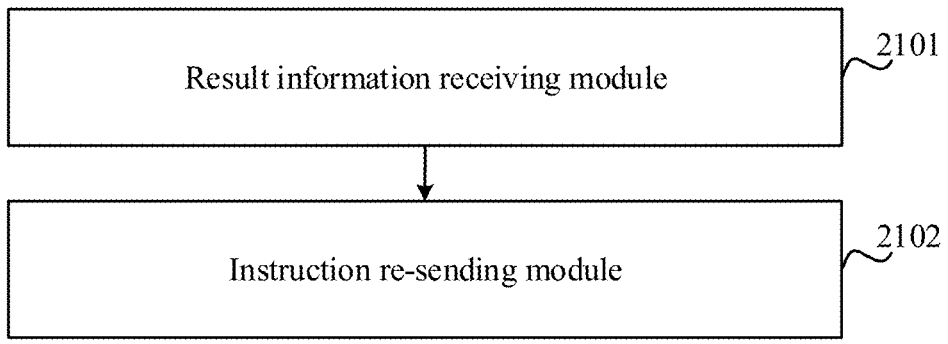
FIG. 21 is a block diagram illustrating an unlocking apparatus according to yet another example of the present disclosure.

In an example of the present disclosure, as shown in FIG. 21, the instruction sending unit 1502 may also include:
  a result information receiving module 2101, configured to receive result information which is fed back by the mobile terminal after the mobile terminal performs unlocking in response to the preset instruction; and
  an instruction re-sending module 2102, configured to re-send the preset instruction when the result information indicates a failure of unlocking, where a number of times of re-sending the preset instruction is less than a set number-of-time threshold.

Figure 22:
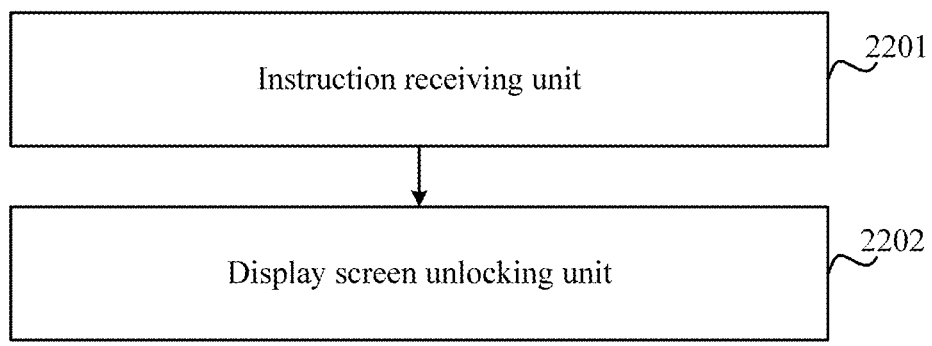
FIG. 22 is a block diagram illustrating an unlocking apparatus according to yet another example of the present disclosure.

An example of the present disclosure also provides an unlocking apparatus. As shown in FIG. 22, the apparatus may include:
  an instruction receiving unit 2201, configured to receive a preset instruction from a control device, where the preset instruction is used to control the mobile terminal to unlock a display screen; and a display screen unlocking unit 2202, configured to unlock the display screen in response to the preset instruction.

Figure 23:
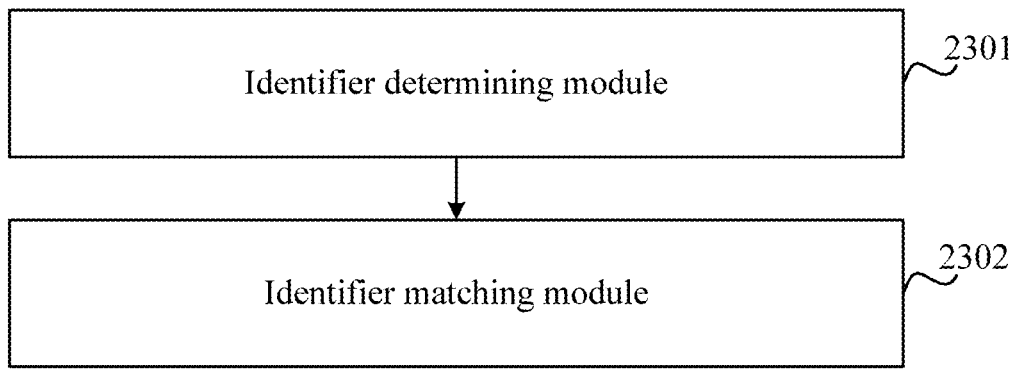
FIG. 23 is a block diagram illustrating an unlocking apparatus according to an example of the present disclosure.

In an example of the present disclosure, as shown in FIG. 23, the display screen unlocking unit 2202 may include:

an identifier determining module 2301, configured to determine an identifier of the control device sending the preset instruction; and an identifier matching module 2302, configured to determine whether the identifier matches an identifier in a trusted device list of the mobile terminal.

The trusted device list of the mobile terminal includes identifiers of one or more control devices that have established a Bluetooth connection with the mobile terminal before.

Figure 24:
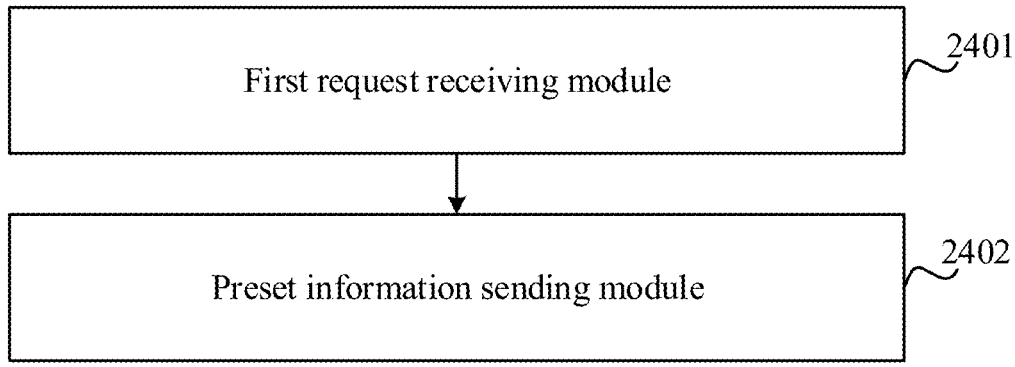
FIG. 24 is a block diagram illustrating an unlocking apparatus according to another example of the present disclosure.

In an example of the present disclosure, the apparatus also includes an information feedback unit. As shown in FIG. 24, the information feedback unit may include:

a first request receiving module 2401, configured to receive a preset information request from the control device, where the preset information request is used to request from a mobile terminal preset information including an acceleration value of the mobile terminal and the like; and a preset information sending module 2402, configured to send preset information to the control device in response to the preset information request.

Figure 25:
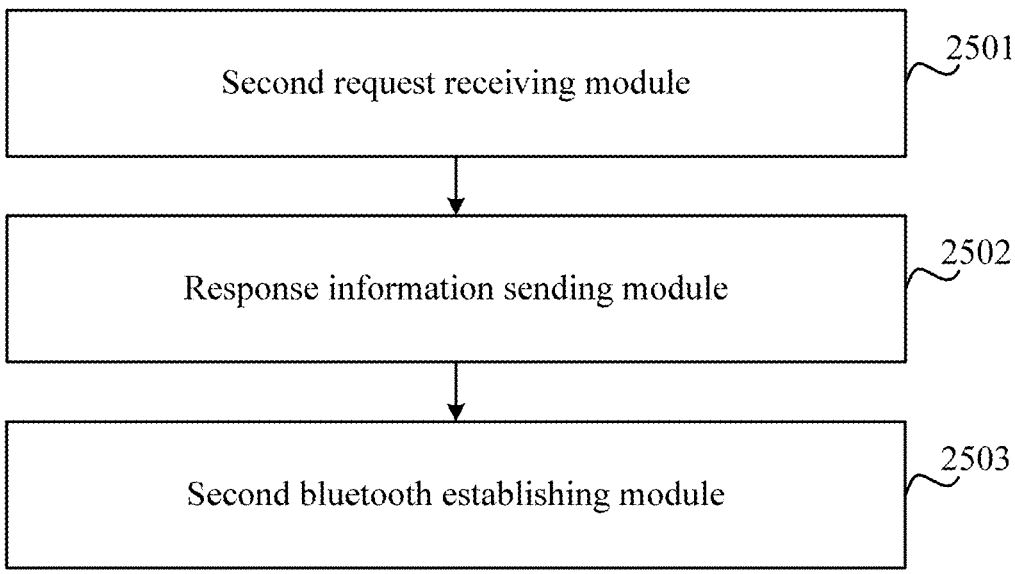
FIG. 25 is a block diagram illustrating an unlocking apparatus according to still another example of the present disclosure.

In an example of the present disclosure, the apparatus may also include a second Bluetooth unit. As shown in FIG. 25, the second Bluetooth unit may include:

a second request receiving module 2501, configured to receive a Bluetooth connection request from the control device;

a response information sending module 2502, configured to send Bluetooth connection response information to the control device; and a second Bluetooth establishing module 2503, configured to establish a Bluetooth connection with the control device.

Figure 26:
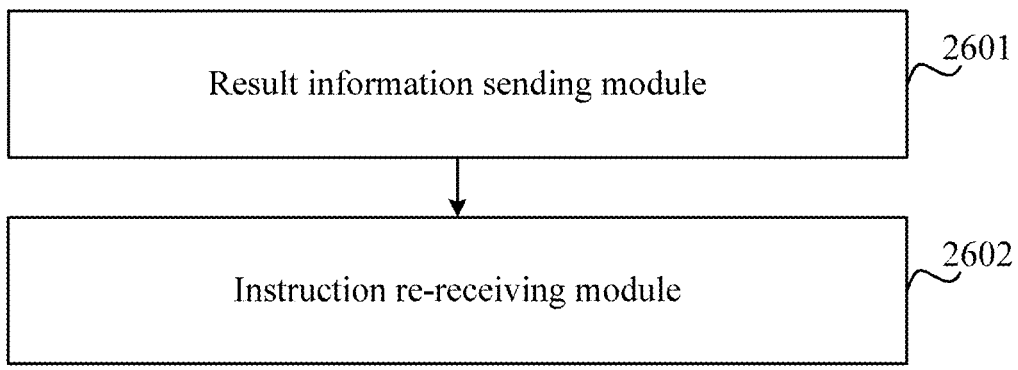
FIG. 26 is a block diagram illustrating an unlocking apparatus according to yet another example of the present disclosure.

In an example of the present disclosure, as shown in FIG. 26, the display screen unlocking unit 2202 may include:

a result information sending module 2601, configured to send result information of unlocking in response to the preset instruction to the control device; and an instruction re-receiving module 2602, configured to re-receive the preset instruction from the control device if the result information sent to the control device indicates a failure of unlocking.

An example of the present disclosure also provides an electronic device, including: a processor; and a memory storing instructions executable by the processor. The processor is configured to: determine whether a mobile terminal to be unlocked exists; and send a preset instruction to the mobile terminal when the mobile terminal to be unlocked exists, where the preset instruction is used to control the mobile terminal to unlock a display screen.

An example of the present disclosure also provides an electronic device, including: a display screen; a processor; and a memory storing instructions executable by the processor. The processor is configured to: receive a preset instruction from a control device, where the preset instruction is used to control the mobile terminal to unlock a display screen; and unlock the display screen in response to the preset instruction.

An example of the present disclosure also provides a computer readable storage medium that stores a computer program, where the computer readable storage medium stores a plurality of computer instructions and the computer instructions are executed to:

determine whether a mobile terminal to be unlocked exists; and send a preset instruction to the mobile terminal when determining that the mobile terminal exists, where the preset instruction is used to control the mobile terminal to unlock a display screen.

An example of the present disclosure also provides a computer readable storage medium that stores a computer program, where the computer readable storage medium stores a plurality of computer instructions and the computer instructions are executed to:

receive a preset instruction from a control device, where the preset instruction is used to control the mobile terminal to unlock a display screen; and unlock the display screen in response to the preset instruction.

Figure 27:
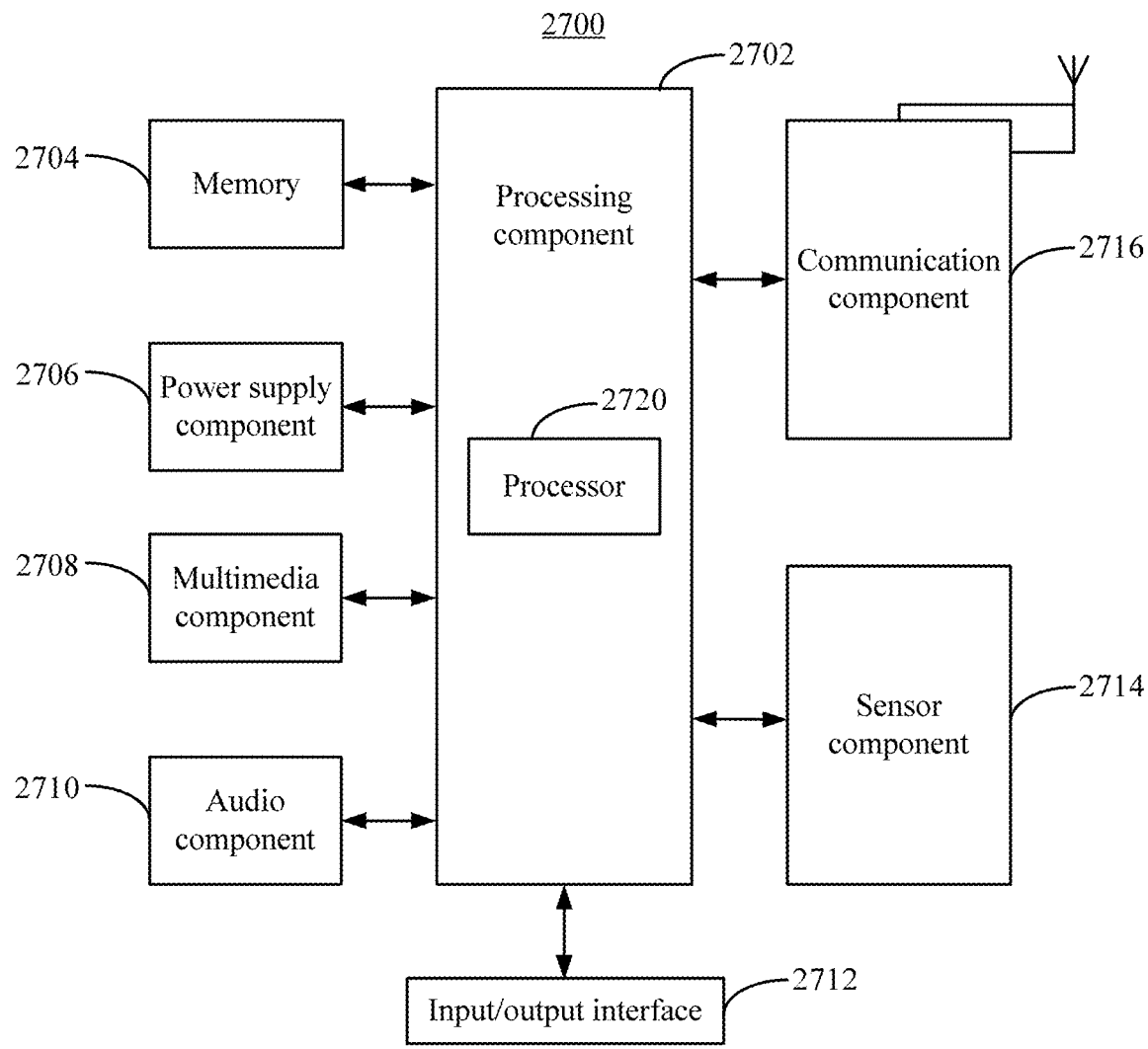
FIG. 27 is a schematic diagram illustrating a structure of an electronic device according to an example of the present disclosure.

FIG. 27 is a block diagram illustrating an electronic device according to an example of the present disclosure. For example, the electronic device 2700 may be a mobile phone, a computer, a digital broadcasting terminal, a message transceiving device, a game console, a tablet device, a medical device, a fitness device, a personal digital assistant, and the like.

As shown in FIG. 27, the electronic device 2700 may include one or more of a processing component 2702, a memory 2704, a power supply component 2706, a multimedia component 2708, an audio component 2710, an input/output (I/O) interface 2712, a sensor component 2714 and a communication component 2716.

The processing component 2702 usually controls overall operations of the device 2700, such as operations related to display, telephone call, data communication, camera operation and recording operation. The processing component 2702 may include one or more processors 2720 for executing instructions. Further, the processing component 2702 may include one or more modules to facilitate interaction between the processing component 2702 and other components. For example, the processing component 2702 may include a multimedia module to facilitate the interaction between the multimedia component 2708 and the processing component 2702.

The memory 2704 is configured to store different types of data to support operations of the device 2700. Examples of such data include instructions, contact data, phonebook data, messages, pictures, videos, and so on for any application or method that operates on the device 2700. The memory 2704 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power supply component 2706 supplies power for different components of the device 2700. The power supply component 2706 may include a power supply management system, one or more power supplies, and other components associated with generating, managing and distributing power for the device 2700.

The multimedia component 2708 includes a screen for providing an output interface between the device 2700 and a user. In some examples, the screen may include a Liquid Crystal Display (LCD) and a Touch Panel (TP). If the screen includes a touch panel, the screen may be implemented as a touch screen for receiving an input signal from a user. The touch panel may include one or more touch sensors for sensing a touch, a slide and a gesture on the touch panel. The touch sensor may not only sense a boundary of a touching or sliding movement, but also detect duration and pressure related to the touching or sliding operation. In some examples, the multimedia component 2708 includes a front camera and/or a rear camera. When the device 2700 is in an operation mode, such as a shooting mode or a video mode, the front camera and/or the rear camera may receive external multimedia data. Each of the front camera and the rear camera may be a fixed optical lens system or be capable of a focal length and an optical zoom capability.

The audio component 2710 is configured to output and/or input an audio signal. For example, the audio component 2710 includes a microphone (MIC). When the device 2700 is in an operation mode, such as a call mode, a record mode and a voice recognition mode, the microphone is configured to receive an external audio signal. The received audio signal may be further stored in the memory 2704 or sent via the communication component 2716. In some examples, the audio component 2710 also includes a speaker for outputting an audio signal.

The I/O interface 2712 provides an interface between the processing component 2702 and a peripheral interface module. The peripheral interface module may be a keyboard, a click wheel, a button, or the like. These buttons may include, but are not limited to, a home button, a volume button, a start button and a lock button.

The sensor component 2714 includes one or more sensors for providing a state assessment in different aspects for the device 2700. For example, the sensor component 2714 may detect an open/closed state of the device 2700 and a relative location of components. For example, the components are a display and a keypad of the device 2700. The sensor component 2714 may also detect a position change of the device 2700 or a component of the device 2700, whether a user touches the device 2700, an orientation or acceleration/deceleration of the device 2700, and a temperature change of the device 2700. The sensor component 2714 may include a proximity sensor for detecting the existence of a nearby object without any physical touch. The sensor component 2714 may also include an optical sensor, such as a CMOS or CCD image sensor used in an imaging application. In some examples, the sensor component 2714 may also include an acceleration sensor, a gyro sensor, a magnetic sensor, a pressure sensor or a temperature sensor.

The communication component 2716 is configured to facilitate wired or wireless communication between the device 2700 and other devices. The device 2700 may access a wireless network based on a communication standard, such as WiFi, 2G or 3G, or a combination thereof. In an example, the communication component 2716 receives a broadcast signal or broadcast related information from an external broadcast management system via a broadcast channel. In an example, the communication component 2716 may also include a Near Field Communication (NFC) module for promoting short range communication. For example, the NFC module may be implemented based on radio frequency identification (RFID) technology, infrared data association (IrDA) technology, ultra-wideband (UWB) technology, Bluetooth (BT) technology and other technology.

In an example, the device 2700 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components. Each module, unit, sub-module, or sub-unit may be partially implemented using one or more of the above electronic components.

In an example, a non-transitory computer readable storage medium including instructions, such as a memory 2704 including instructions, is also provided. The instructions may be executed by the processor 2720 of the device 2700. For example, the non-transitory computer readable storage medium may be a Read-Only Memory (ROM), a Random Access Memory (RAM), a CD-ROM, a magnetic tape, a floppy disk, an optical data storage device, etc.

After considering the specification and practicing the present disclosure, the persons of skill in the prior art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the prior art not disclosed in the present disclosure. The specification and examples herein are intended to be illustrative only and the real scope and spirit of the present disclosure are indicated by the claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

What is claimed is:

1. An unlocking method, comprising:
   determining, by a control device for Augmented Reality (AR), whether a mobile terminal to be unlocked exists;
   obtaining, by the control device, a trusted device list comprising identifiers of one or more trusted mobile terminals that have established a wireless connection with the control device before;
   sending, by the control device, a preset information request to the one or more trusted mobile terminals in the trusted device list for requesting an acceleration value from each of the trusted mobile terminals;
   determining, by the control device, one of the trusted mobile terminals as the mobile terminal to be unlocked when the acceleration value acquired from the one of the trusted mobile terminals exceeds a preset acceleration threshold, wherein the preset acceleration threshold is set according to different scenarios, wherein the different scenarios comprise mobile terminal movements relative to a face of a user; and
   sending, by the control device, a preset instruction to the mobile terminal to be unlocked when the mobile terminal to be unlocked exists, wherein the preset instruction is used to control the mobile terminal to unlock a display screen.

2. The unlocking method of claim 1, wherein determining whether the mobile terminal to be unlocked exists comprises:
   reading, by the control device, a pre-stored reference image comprising the mobile terminal;
   comparing, by the control device, a current scene picture of the AR with the reference image; and determining, by the control device, that the mobile terminal to be unlocked exists when a matching degree of the current scene picture and the reference image exceeds a preset value.

3. The unlocking method of claim 1, wherein sending the preset instruction to the mobile terminal comprises:
    detecting, by the control device, a color of an image region in a scene picture of the AR, wherein the mobile terminal is located in the image region; and
    sending, by the control device, the preset instruction to the mobile terminal when the detected color indicates that the mobile terminal is in a black screen state.

4. The unlocking method of claim 3, wherein sending the preset instruction to the mobile terminal further comprises:
    detecting, by the control device, content displayed on a display screen of the mobile terminal when the detected color indicates that the mobile terminal is in a non-black screen state; and
    sending, by the control device, the preset instruction to the mobile terminal when a designated content is detected.

5. The unlocking method of claim 1, further comprising:
    receiving, by the control device, result information which is fed back by the mobile terminal after the mobile terminal performs unlocking in response to the preset instruction; and
    re-sending, by the control device, the preset instruction when the result information indicates a failure of unlocking, wherein a number of times of re-sending the preset instruction is less than a set number-of-time threshold.

6. The unlocking method of claim 1, wherein the acceleration value is used to indicate whether the mobile terminal to be unlocked is moved by the user and that the user has a need for using the mobile terminal.

7. An unlocking method, comprising:
    receiving, by a mobile terminal applied to Augmented Reality (AR), a preset instruction from a control device of the AR, wherein the preset instruction is used to control the mobile terminal to unlock a display screen;
    receiving, by the mobile terminal, a preset information request from the control device; and
    sending, by the mobile terminal, preset information comprising an acceleration value of the mobile terminal to the control device in response to the preset information request, wherein the acceleration value is compared to a preset acceleration threshold, wherein the preset acceleration threshold is set according to different scenarios, wherein the different scenarios comprise mobile terminal movements relative to a face of a user; and
    unlocking, by the mobile terminal, the display screen in response to the preset instruction.

8. The unlocking method of claim 7, wherein unlocking the display screen in response to the preset instruction comprises:
    determining, by the mobile terminal, an identifier of the control device sending the preset instruction; and
    unlocking, by the mobile terminal, the display screen when the identifier matches an identifier in a trusted device list of the mobile terminal, wherein the trusted device list comprises identifiers of one or more trusted control devices that have established a wireless connection with the mobile terminal before.

9. The unlocking method of claim 7, further comprising:
    sending, by the mobile terminal, result information of unlocking in response to the preset instruction to the control device.

10. The unlocking method of claim 7, wherein the acceleration value is used to indicate whether the mobile terminal is moved by the user and that the user has a need for using the mobile terminal.

11. An unlocking apparatus, comprising:
    a processor; and
    a memory storing instructions executable by the processor;
    wherein by executing the processor executable instructions, the processor is caused to:
        determine whether a mobile terminal to be unlocked exists;
        obtain a trusted device list comprising identifiers of one or more trusted mobile terminals that have established a wireless connection with the control device before;
        send a preset information request to the one or more trusted mobile terminals in the trusted device list for requesting an acceleration value from each of the trusted mobile terminals;
        determine one of the trusted mobile terminals as the mobile terminal to be unlocked when the acceleration value acquired from the one of the trusted mobile terminals exceeds a preset acceleration threshold, wherein the preset acceleration threshold is set according to different scenarios, wherein the different scenarios comprise mobile terminal movements relative to a face of a user; and
        send a preset instruction to the mobile terminal to be unlocked when the mobile terminal to be unlocked exists, wherein the preset instruction is used to control the mobile terminal to unlock a display screen.

12. The unlocking apparatus of claim 11, wherein when determining whether the mobile terminal to be unlocked exists, the processor is configured to:
    read a pre-stored reference image comprising the mobile terminal;
    compare a current scene picture of the AR with the reference image; and
    determine that the mobile terminal to be unlocked exists when a matching degree of the current scene picture and the reference image exceeds a preset value.

13. The unlocking apparatus of claim 11, wherein when sending the preset instruction to the mobile terminal, the processor is configured to:
    detect a color of an image region in a scene picture of the AR, wherein the mobile terminal is located in the image region; and
    send the preset instruction to the mobile terminal when the detected color indicates that the mobile terminal is in a black screen state.

14. The unlocking apparatus of claim 13, wherein when sending the preset instruction to the mobile terminal, the processor is configured to:
    detect content displayed on a display screen of the mobile terminal when the detected color indicates that the mobile terminal is in a non-black screen state; and
    send the preset instruction to the mobile terminal when a designated content is detected.

15. The unlocking apparatus of claim 11, wherein the processor is further configured to: receive result information which is fed back by the mobile terminal after the mobile terminal performs unlocking in response to the preset instruction; and
    re-send the preset instruction when the result information indicates a failure of unlocking, wherein a number of times of re-sending the preset instruction is less than a preset number-of-time threshold.

16. The unlocking apparatus of claim 11, wherein the acceleration value is used to indicate whether the mobile terminal is moved by the user and that the user has a need for using the mobile terminal.

* * * * *